United States Patent [19]

Nakahata et al.

[11] Patent Number: 5,359,402
[45] Date of Patent: Oct. 25, 1994

[54] IMAGE FORMING APPARATUS CAPABLE OF FORMING IMAGES SIDE BY SIDE

[75] Inventors: Akinobu Nakahata, Sakai; Katsuhide Yamaguchi, Takatsuki; Kenji Oda, Toyonaka; Kouji Migita, Sakai; Hiroshi Kubota, Osaka; Yoshinori Makiura, Kawachinagano; Masami Fuchi, Neyagawa, all of Japan

[73] Assignee: Mita Industrial Co., Ltd., Osaka, Japan

[21] Appl. No.: 985,416

[22] Filed: Dec. 4, 1992

[30] Foreign Application Priority Data

Dec. 17, 1991 [JP] Japan .................. 3-333375

[51] Int. Cl.$^5$ ............................. G03G 21/00
[52] U.S. Cl. ................... 355/309; 355/72; 355/127
[58] Field of Search ............ 355/50, 72, 114, 127, 355/309

[56] References Cited

U.S. PATENT DOCUMENTS

| H000021 | 2/1986 | Schieck .................. 355/72 |
|---|---|---|
| 4,229,113 | 10/1980 | Anderson et al. . |
| 4,524,691 | 6/1985 | Miller . |
| 4,603,846 | 8/1986 | Miles . |
| 4,733,310 | 3/1988 | Kapp et al. . |

*Primary Examiner*—Monroe H. Hayes
*Attorney, Agent, or Firm*—Jordan and Hamburg

[57] ABSTRACT

An image forming apparatus includes a mount portion which permits a cassette containing a plurality of stacks of sheets arranged side by side in rows to be mounted to the image forming apparatus; a feeder for feeding sheets side by side in a state where the cassette is mounted to the mount portion; an imaging assembly for forming an image on each of the sheets being fed side by side; a sheet sensor for detecting the presence or absence of a sheet contained in the cassette for each row; and a control unit for, when the absence of a sheet is detected in any of the rows, stopping at least an image forming operation along a corresponding transport path. Accordingly, even if all the sheets run out in any one of the rows, the corresponding transport path and the like can be prevented from getting smeared due to the image forming operation carried out despite the fact that no sheets are being fed.

10 Claims, 7 Drawing Sheets

IMAGE FORMING APPARATUS CAPABLE OF FORMING IMAGES SIDE BY SIDE

BACKGROUND OF THE INVENTION AND RELATED ART STATEMENT

This invention relates to an image forming apparatus in which sheets contained side by side in cassettes are fed along parallel transport paths and images are formed on the respective sheets.

There has been known a printer, or like image forming apparatus in which small sized sheet materials such as envelopes are contained side by side in cassettes, data such as addresses output from a data storage provided in a personal computer are formed on the surface of a photosensitive member as toner images, and the formed toner images are transferred to sheet materials being transported side by side.

In the image forming apparatus of this type, a plurality of sheet sensors are arranged above each row of sheets defined in the cassette containing the single stack of sheets or stacks of sheets arranged side by side so as to detect the presence or absence of the sheets contained therein. These sheet sensors consist essentially of a photointerrupter including a light emitting element and a photodetector, and a lever which is provided rotatably between the two elements and comes into contact with the uppermost one of the corresponding stack of sheets in the cassette due to the weight thereof. These sensors are designed to determine the presence of a sheet in the cassette by detecting the height of the uppermost one of the sheets contained in the cassette.

In the conventional apparatus of this type, when the small sized sheets are fed side by side from the cassette, the feed of the sheets is continued even if one stack of sheets runs out (there is no sheet fed along one of the transport paths) until the other stack of sheets run out.

Thus, a toner image to be transferred to the sheet fed from the stack of sheets that has run out deposits on the transfer device and the transport path downstream therefrom, thereby smearing the same. Further, the smear on the transfer device and the like deposits on a sheet fed next, thereby smearing that sheet.

As a countermeasure for this, it can be considered to set the same number of sheets in each stack. However, this requires the precise counting of the sheets each time the sheets are set, and thus an operator is obliged to take time and labor to set the sheets.

SUMMARY OF THE INVENTION

In view of the problems residing in the prior art, it is an object of the invention to provide an image forming apparatus which, when any one of stacks of sheets contained side by side in cassettes have run out, stops an image forming operation along a transport path corresponding to the run out stack of sheets, thereby preventing the transport path or the like from getting smeared.

Accordingly, an image forming apparatus of the invention comprises a mount portion which permits a cassette containing a plurality of stacks of sheets arranged side by side in rows to be mounted to the image forming apparatus; feed means for feeding sheets side by side in a state where the cassette is mounted to the mount portion; imaging means for forming an image on each of the sheets being fed side by side; sheet detector means for detecting the presence or absence of a sheet contained in the cassette for each row; and control means for, when the absence of a sheet is detected in any of the rows, stopping at least an image forming operation along a corresponding transport path.

With the image forming apparatus thus constructed, the sheets of the respective rows contained in the cassette mounted to the mount portion are fed side by side simultaneously by the feed means, and have the images formed thereon along the respective transport paths. At this time, the presence or absence of a sheet in the respective rows is detected individually by the sheet detector means. When the absence of a sheet is detected in any one of the rows, the image forming operation is stopped at least along the corresponding transport path. Thus, the corresponding transport path and the like can be prevented from getting smeared due to the image forming operations carried out despite the fact that no sheets are being fed.

The sheet detector means may include a plurality of photointerrupters arranged in correspondence with the respective stacks of sheets contained side by side in the cassette mounted to the mount portion.

When the absence of a sheet is detected in any of the rows, the control means may stop the image forming operation only along the corresponding transport path.

With this arrangement, the image forming operation is stopped only along the transport path corresponding to the row in which the absence of a sheet is detected. Along the other transport path(s), the image forming operation is continued. Thus, the corresponding transport path and the like can be prevented from getting smeared. When the sheets run out in all the rows, the operation of the image forming apparatus is stopped.

Further, the control means may stop the image forming operation along all the transport paths when the absence of a sheet is detected in any of the rows. This prevents the transport paths and the like from getting smeared.

The feed means may feed the sheets until the absence of a sheet is detected in all the rows when the forming operations are stopped along all the transport paths.

With this arrangement, the image forming operations are stopped along all the transport paths when the absence of a sheet is detected in any one of the rows, and all the sheets remaining in the other row(s) are fed. Accordingly, the transport paths and the like can be prevented from getting smeared and the sheets can be constantly fed side by side. When the sheets run out in all the rows, the operation of the image forming apparatus is stopped.

These and other objects, features and advantages of the present invention will become more apparent upon a reading of the following detailed description and accompanying drawings.

DETAILED DESCRIPTION OF PREFERRED EMBODIMENTS OF THE INVENTION

Figure 1:
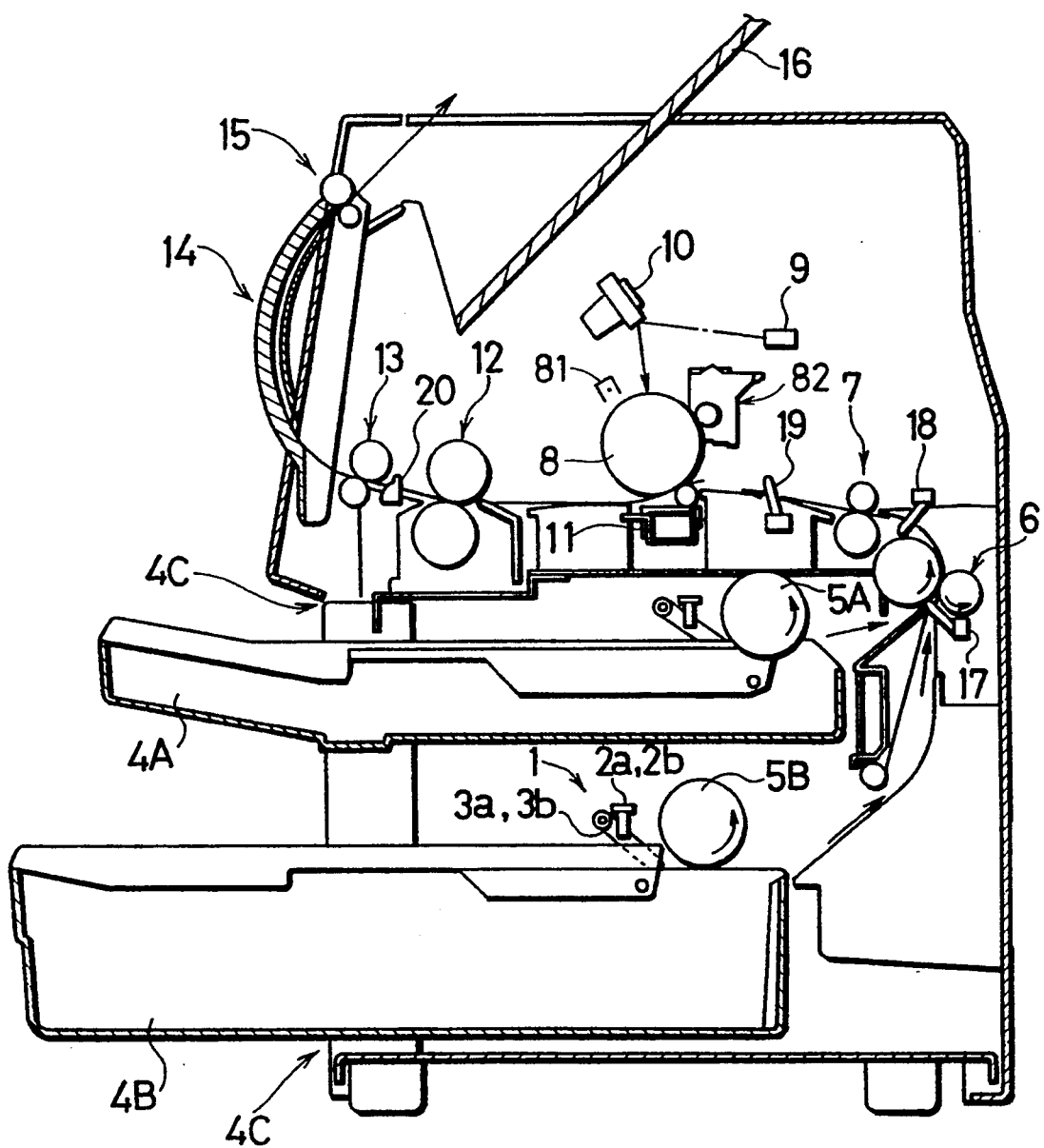
FIG. 1 is a schematic diagram showing an image forming apparatus embodying the invention.

FIG. 1 is a schematic diagram showing an image forming apparatus embodying the invention.

The image forming apparatus is provided with feed rollers 5A, 5B for feeding sheets, pairs of separating rollers 6 and registration rollers 7, a photosensitive member 8 in the form of a drum, a charger 81 and a developing device 82 arranged around the member 8, a light emitting unit 9 including a laser or the like, a polygonal mirror 10, a transfer device 11, a fixing device 12 including fixing rollers 12, pairs of discharge rollers 13, 15, a discharge guide 14, a discharge tray 16, etc. In addition, cassettes 4A, 4B containing sheets therein are attachable to corresponding mount portions 4C formed in the image forming apparatus.

Figure 2:
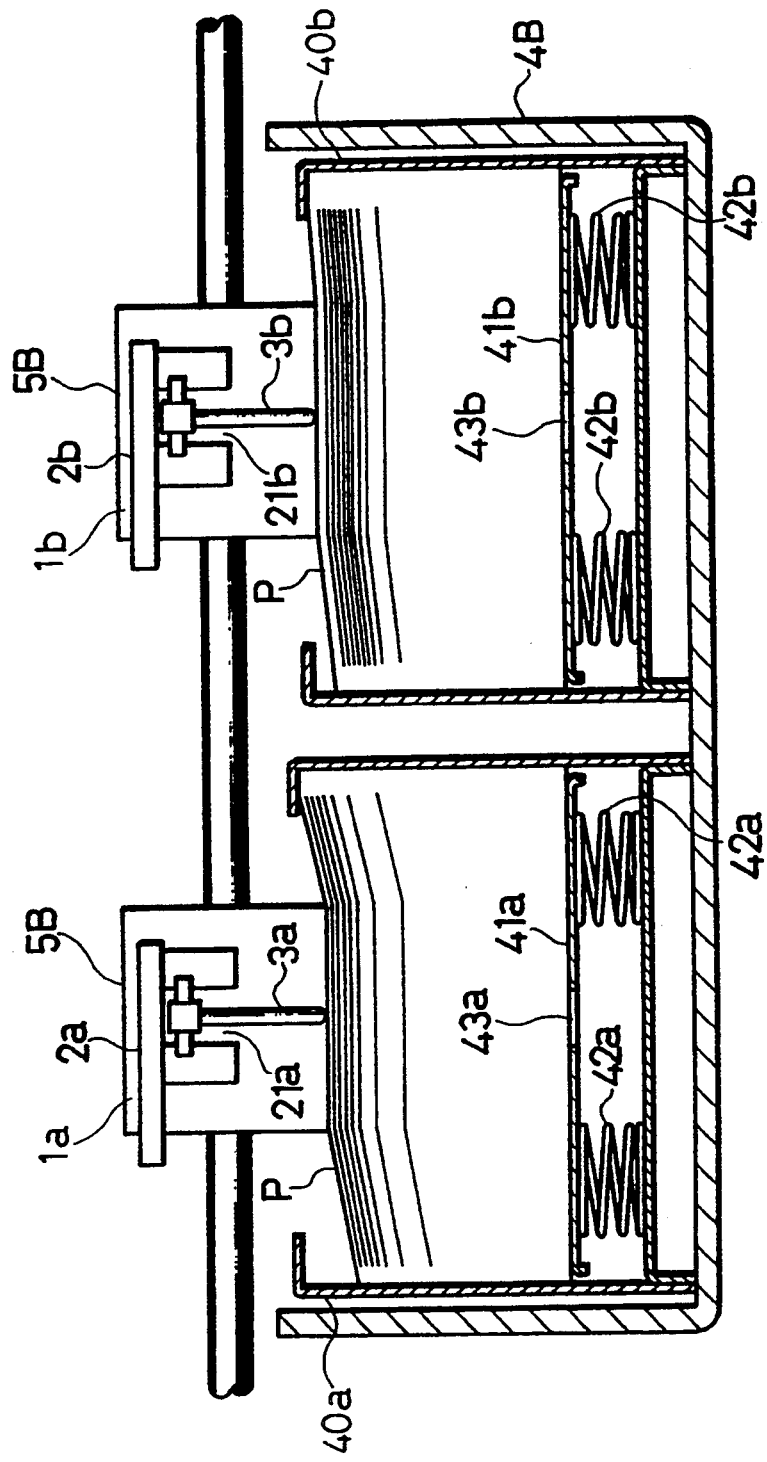
FIG. 2 is a sectional view showing a cassette and sheet sensors when the cassette containing stacks of small sized sheets side by side therein is attached to the image forming apparatus.

As shown in FIG. 2, the cassette 4B has sheet aligning units 40a, 40b arranged side by side in rows a, b. Stacks of small sized sheets are contained side by side in the cassette 4B.

The image forming apparatus includes sheet sensors 1, multifeed sensors 17, registration sensors 18, timing sensors 19, discharge sensors 20, etc. The sheet sensors 1 detect the presence of the sheets contained in the cassette 4B. The multifeed sensors 17 detect a multiple feeding of sheets. The registration sensors 18 are adapted for measuring a timing at which the registration rollers 7 are driven. The timing sensors 19 are adapted for measuring a timing at which the light emitting unit 9 or the like starts emitting the light. The discharge sensors 20 detect discharge of the sheet. It will be appreciated that two each of these sensors are arranged along two transport paths so as to detect the sheets being fed side by side in this embodiment.

The sheets stacked up in the cassette 4B are fed one by one to the separating rollers 6 from the uppermost sheets by the feed rollers 5B, and further transported by the separating rollers 6, thereby coming into contact with the registration rollers 7. The registration rollers 7 are controllably driven in accordance with signals from the registration sensors 18.

On the other hand, in accordance with signals from the timing sensors 19, image signals input through an unillustrated data storage or the like externally connected to the image forming apparatus are optically modulated into modulated beams (laser beams) in the light emitting unit 9, and emitted therefrom. The photosensitive member 8 charged by the charger 81 is exposed to the laser beams from the light emitting unit 9 by way of the polygonal mirror 10. When the sheets are transported side by side, the number of electrostatic latent images corresponding to the number of transport paths of sheets are formed on the surface of the photosensitive member 8 in juxtaposition with each other along an axial direction of the member 8. Thus formed electrostatic latent images are developed into toner images by the developing device 82.

These toner images are, after being transferred to the sheets by the transfer device 11, fixed onto the sheets by the fixing device 12. The sheets having the toner images fixed thereon are discharged by the pairs of discharge rollers 13, 15 onto the discharge tray 16 through the discharge guide 14.

An example of a specific construction of the sheet sensor 1 will be described next with reference to FIG. 2.

The sheet sensors 1a, 1b are arranged in specified positions of an image forming apparatus main body (to which sheets are fed) for detecting the height of the uppermost sheets contained in the cassette 48 respectively. These sensors 1a, 1b consist essentially of photointerrupters 2a, 2b each including, for example, a light emitting element and a photodetector, and levers 3a, 3b each provided rotatably between the corresponding light emitting element and photodetector. The sensors 1a, 1b are located above the sheet aligning units 40a, 40b respectively.

Figure 3:
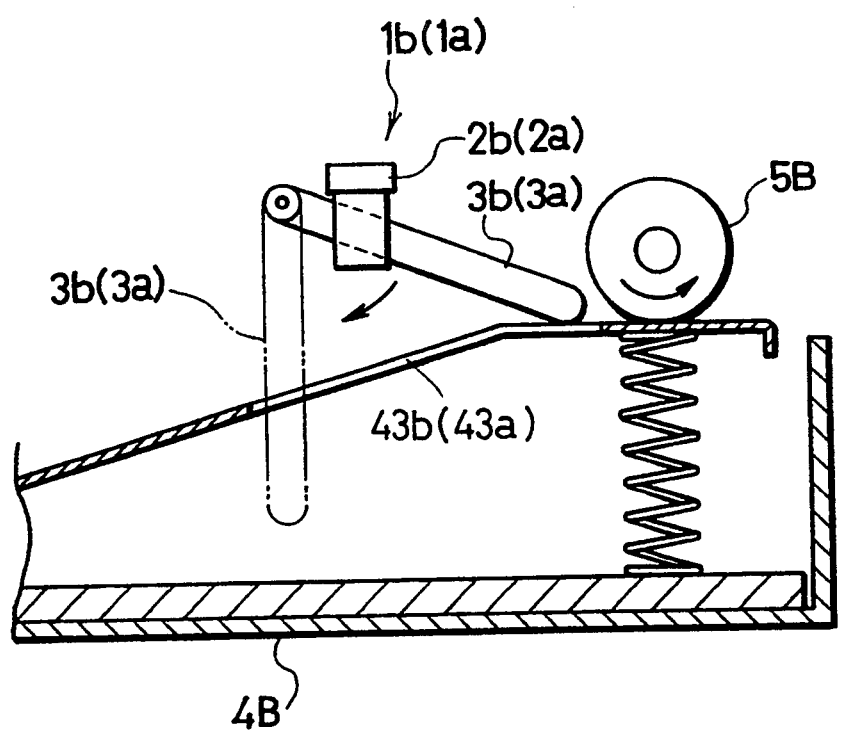
FIG. 3 is a schematic diagram showing an operation of the sheet sensor.

The levers 3a, 3b are constructed such that lower ends thereof come into contact with the uppermost ones of sheets P stacked up on sheet holding plates 41a, 41b of the sheet aligning units 40a, 40b. The holding plates 41a, 41b are biased upwards by helical springs 42a, 42b so that the uppermost ones of sheets P stacked thereon come into contact with the feed rollers 5B at a suitable pressure. Further, as shown in FIG. 3, there are defined oblong slots 43a, 43b extending in a sheet feeding direction in specified positions of the holding plates 41a, 41b. The levers 3a, 3b are designed to rotate down to a vertical position (a position indicated by phantom line in FIG. 3) due to the weight thereof when the sheets P run out.

The photointerrupters 2a, 2b are turned off when the levers 3a, 3b are located in clearances 21a, 21b between the light emitting elements and photodetectors as represented by solid line in FIG. 3, while being turned on when the levers 3a, 3b are rotated down to be located in the aforementioned oblong slots 43a, 43b as represented by phantom line in FIG. 3.

The shape of the levers 3a, 3b are simplified as illustrated such that the levers 3a, 3b are free to rotate clockwise in the drawing of FIG. 3. With the simply shaped levers 3a, 3b, the cassette 4B is permitted to be detached from the image forming apparatus even when the levers 3a, 3b are located in the positions as indicated by phantom line in FIG. 3.

Figure 4:
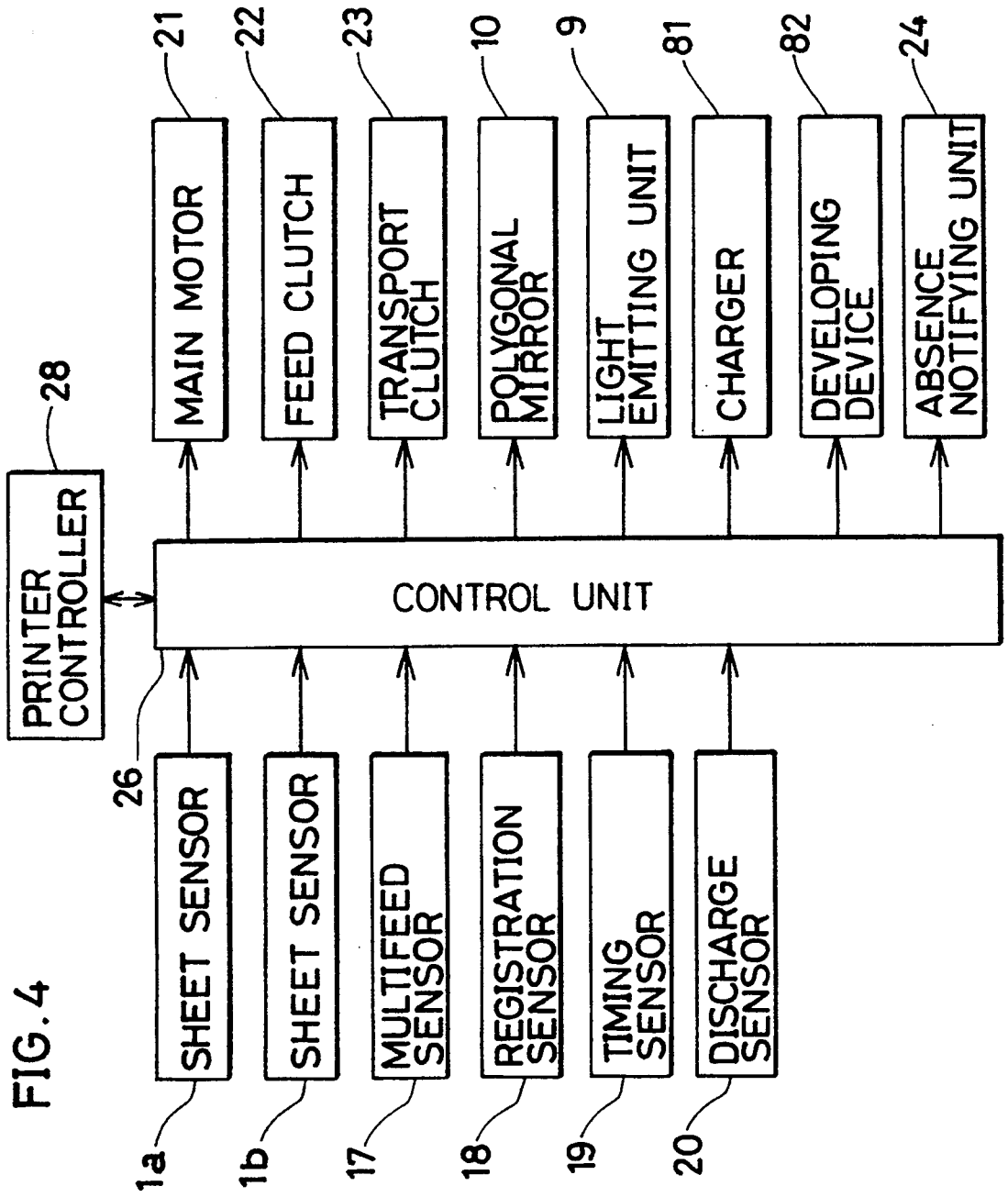
FIG. 4 is a block diagram showing a control system provided in the image forming apparatus.

There will be described a construction of a control system of the image forming apparatus next with reference to a block diagram shown in FIG. 4.

This control system is provided with a control unit 26, an input unit including the sensors, and an output unit including a motor or the like. The control unit 26 is designed to output a signal to the output unit so as to instruct some operation or for other purposes in accordance with a signal from the input unit.

The control unit 26 includes a CPU or the like, and is adapted for processing an image data from the unillustrated data storage or the like externally connected to the image forming apparatus and for outputting the processed image data to the light emitting unit 9 and the polygonal mirror 10. The control unit 26 is provided with control functions of stopping an image forming operation in a corresponding transport path when either of the sheet sensors 1a, 1b detects the absence of a sheet and of stopping the operation of the image forming apparatus when both of the sheet sensors 1a, 1b detect the absence of a sheet.

The control unit 26 controls a main motor 21, a feed clutch 22, a transport clutch 23, and the like in accordance with sensor signals from the sheet sensors 1a, 1b, the multifeed sensors 17, the registration sensors 18, the timing sensors 19 and the discharge sensors 20.

Further, the control unit 26 outputs a signal to an absence notifying unit 24 when the absence of a sheet is detected, so as to notify an operator of a the absence of a sheet.

The main motor 21 drives the feed rollers 5A, 5B, the separating rollers 6, and the like through the clutches 22, 23. When the feed clutch 22 is engaged, the driving force of the main motor 21 is transmitted to a feed mechanism including the feed rollers 5A, 5B and the separating rollers 6. When the transport clutch 23 is engaged, the driving force of the main motor 21 is transmitted to a transport mechanism including the registration rollers 7, the discharge rollers 13, 15, and the like.

A printer controller 28 processes a print data in accordance with a signal from a CPU 266, and outputs the processed print data to the CPU 266.

Figure 5:
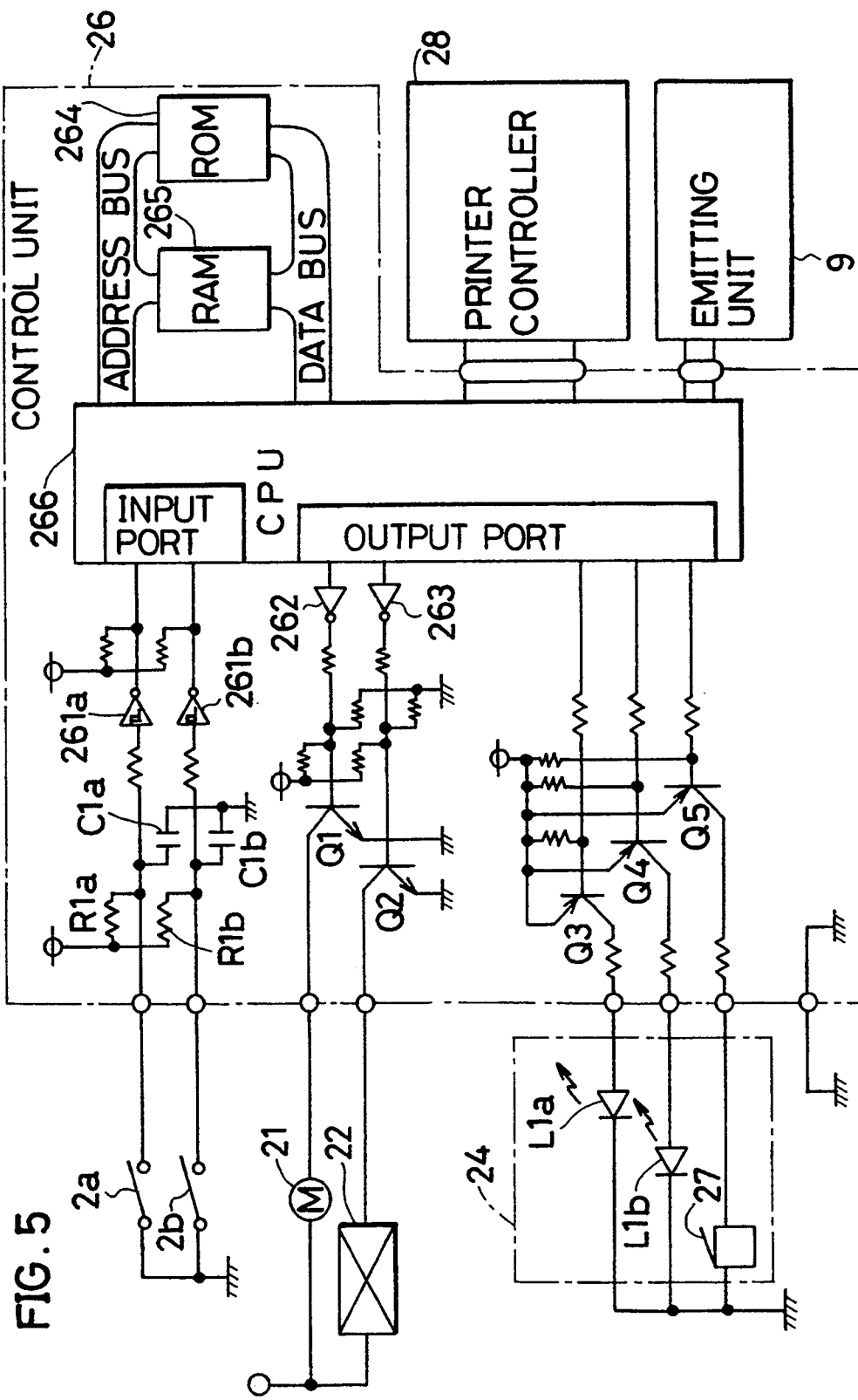
FIG. 5 is a circuit diagram showing a specific construction of a control unit.

There will be described a specific construction of the control unit 26 with reference to a circuit diagram shown in FIG. 5.

The control unit 26 includes inverters 261a, 261b, 262, 263, a ROM 264, a RAM 265, the CPU 266, transistors Q1 to Q5, etc. Resistors R1a, R1b respectively output high signals to the inverters 261a, 2611b when the photointerrupters 2a, 2b of the sheet sensors 1a, 1b are off, while outputting low signals to the inverters 261a, 261b when the photointerrupters 2a, 2b are on. The inverters 261a, 261b invert the output signals from the resistors R1a, R1b and output the inverted signals to the CPU 266.

The inverters 261a, 261b include a hysteresis characteristic each, and function to reduce the influence of chattering or the like of the photointerrupters 2a, 2b together with the capacitors C1a, C1b.

While receiving the low signals from the inverters 261a, 261b, the CPU 266 determines the presence of sheets in the sheet aligning units 40a, 40b, and drives the main motor 21 and the feed clutch 22 through the transistors Q1, Q2 so as to carry out a sheet feeding operation.

Further, the CPU 266 determines the absence of sheets in the sheet aligning unit 40a upon receipt of the high signal from the inverter 261a, and determines the absence of sheets in the sheet aligning unit 40b upon receipt of the high signal from the inverter 261b.

When all the sheets in the sheet aligning unit 40a run out, the CPU 266 turns on a light emitting device L1a through the transistor Q3 to thereby notify the operator of the absence of a sheet in the row a. On the other hand, when all the sheets in the sheet aligning unit 40b run out, the CPU 266 turns on a light emitting device L1b through the transistor Q4 to thereby notify the operator of the absence of sheet in the row b. Further, when all the sheets in both the sheet aligning units 40a and 40b run out, the CPU 266 turns on a buzzer 27 through the transistor Q5 so as to notify the operator that no sheet is left in the cassette 4B.

The ROM 264 stores a main program describing an operation procedure of the image forming apparatus, and the like. The RAM 265 stores various data.

Figure 6:
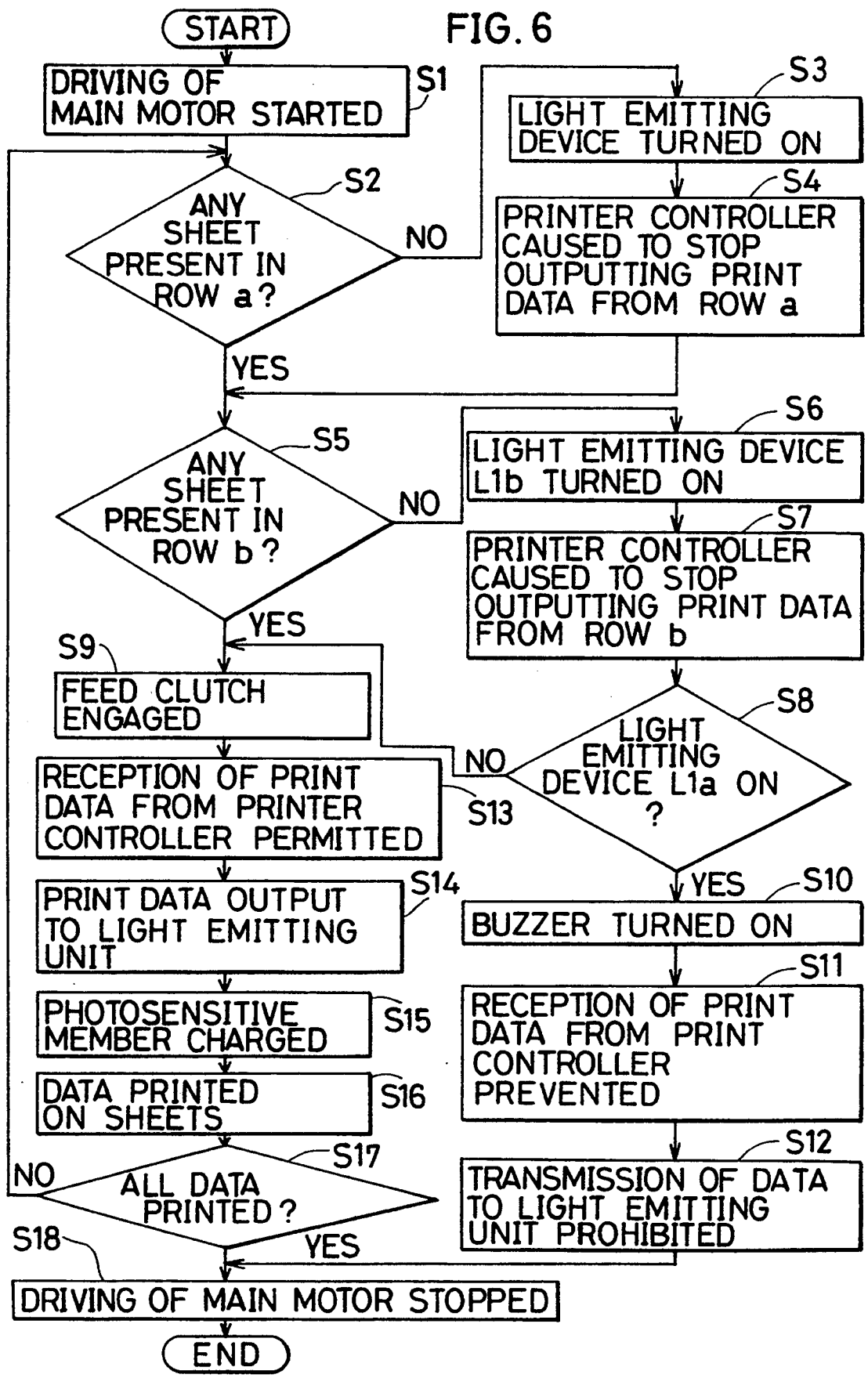
FIG. 6 is a flow chart showing a first operation procedure of the image forming apparatus.

A first operation procedure of the image forming apparatus will be described next with reference to a flow chart shown in FIG. 6.

Upon start of the image forming operation, the main motor 21 is driven in Step S1. Then, in Step S2, it is discriminated whether any sheet is present in the sheet aligning unit 40a (row a), i.e. the low signal is input from the inverter 261a to the CPU 266. If the presence of a sheet is discriminated (YES in Step S2), this routine proceeds to Step S5. On the other hand, if the absence of sheet is discriminated (NO in Step S2), the light emitting device L1a is turned on in Step S3 and the printer controller 28 is caused to stop outputting the print data to be formed on the sheets from the row a in Step S4. Then, this routine proceeds to Step S5.

Subsequently, in Step S5, it is discriminated whether any sheet is present in the sheet aligning unit 40b (row b), i.e. the low signal is input from the inverter 261b to the CPU 266. If the absence of sheet is discriminated (NO in Step S5), the light emitting device L1b is turned on in Step S6 and the printer controller 28 is caused to stop outputting the print data to be formed on the sheet from the row b in Step S7. Then, in Step S8, it is discriminated whether the light emitting device L1a is on. If the light emitting device L1a is off (NO in Step S8), this routine proceeds to Step S9 since there still remains the sheet in the row A. If the light emitting device L1a is on (YES in Step S8), there is no sheet left in either the row a or b. Accordingly, the buzzer 27 is turned on in Step S10; reception of the print data from the print controller 28 is prevented in Step S11; and transmission of the data to the light emitting unit 9 is prohibited in Step S12. Thereafter, the driving of the main motor 21 is stopped, thereby terminating the image forming operation.

On the other hand, if any sheet is present in the sheet aligning unit 40b (YES in Step S5), the feed clutch 22 is engaged to feed the uppermost sheets in the sheet aligning units 40a, 40b in Step S9. Reception of the print data from the printer controller 28 is permitted in Step S13, and the print data are output to the light emitting unit 9 in Step S14. The photosensitive member 8 is charged by the charging device 81 in Step S15, and the data are printed on the sheets in Step S16. Subsequently, it is discriminated whether all the data have been printed in Step S17. If there still remains the data to be printed (NO in Step S17), this routine returns to Step S2. On the other hand, if all the data have been printed (YES in Step S17), the driving of the main motor 21 is stopped in Step S18 and the image forming operation is completed.

In this way, when the sheet runs out in either one of the sheet aligning units 40a, 40b, the image forming operation is stopped in the corresponding transport path. Accordingly, the transfer device 11 and the transport path downstream therefrom can be prevented from getting smeared due to the image forming operations carried out despite the fact that no sheets are being fed. Further, the absence of a sheet in each row can be notified individually, and the sheets can be set in the cassette promptly since a desired number of sheets can be set in this image forming apparatus.

Figure 7:
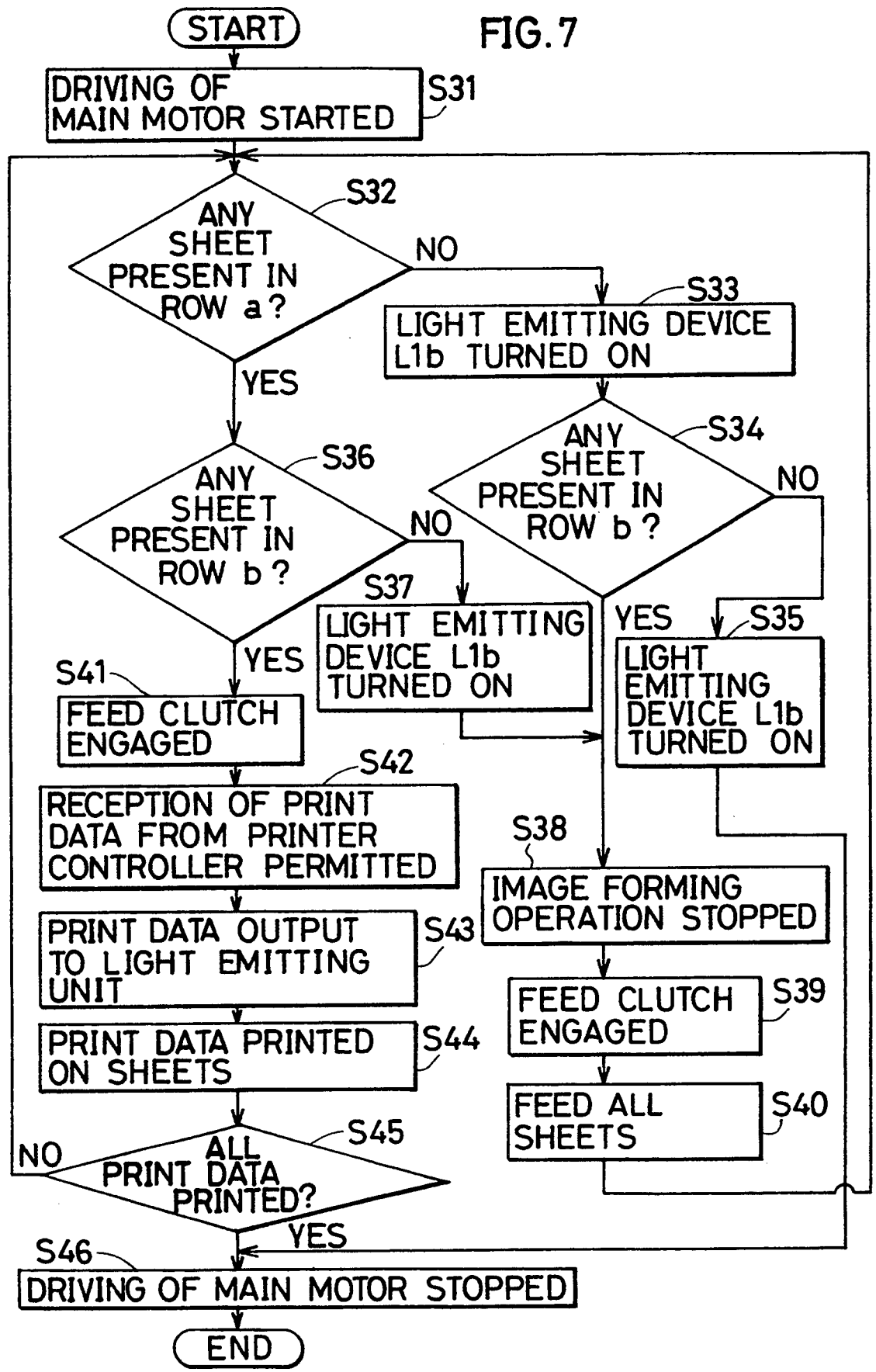
FIG. 7 is a flow chart showing a second operation procedure of the image forming apparatus.

A second operation procedure of the image forming apparatus will be described next with reference to a flow chart shown in FIG. 7. This image forming apparatus is similar to the aforementioned image forming apparatus in its construction and a construction of a control system thereof. However, the control unit 26 is provided with control functions of stopping the image forming operation along all the transport paths when either the sheet sensor 1a or 1b detects the absence of sheet, and of feeding and discharging the remaining sheets until the sensors 1a, 1b both detect the absence of a sheet in that case.

Upon start of the image forming operation, the main motor 21 is driven in Step S31. Then, in Step S32, it is discriminated whether any sheet is present in the sheet aligning unit 40a (row a), i.e. the low signal is input from the inverter 261a to the CPU 266. If the presence of a sheet is discriminated (YES in Step S32), this routine proceeds to Step S36. On the other hand, if the absence of sheet is discriminated (NO in Step S32), the light emitting device L1a is turned on in Step S33.

Subsequently, in Step S34, it is discriminated whether any sheet is present in the sheet aligning unit 40b (row b), i.e. the low signal is input from the inverter 261b to the CPU 266. If the presence of a sheet is discriminated (YES in Step S34), this routine proceeds to Step S38. If the absence of a sheet is discriminated (NO in Step S34), the light emitting device L1b is turned on in Step S35 and the driving of the main motor is stopped in Step S46 since no sheet is present in either the row a or b, thereby terminating the image forming operation.

On the other hand, if any sheet is present in the sheet aligning unit 40a (YES in Step S32), it is discriminated whether any sheet is present in the sheet aligning unit 40b in Step S36. If the absence of sheet is discriminated (NO in Step S36), the light emitting device L1b is turned on in Step S37 and this routine proceeds to Step S38.

In Step S38, the image forming operation is stopped by stopping the transmission of the print data from the printer controller 28. Then, this routine returns to Step S32 after engaging the feed clutch 22 in Step S39 and feeding all the sheets remaining in the sheet aligning units 40a, 40b in Step S40.

On the other hand, if any sheet is present in the sheet aligning unit 40b (YES in Step S36), the sheets are present in both the sheet aligning units 40a and 40b. Accordingly, the feed clutch 22 is engaged to feed the uppermost sheets side by side from the sheet aligning units 40a, 40b in Step S40; reception of the print data from the printer controller 28 is permitted in Step S42; the print data are output to the light emitting unit 9 in Step S43; and the print data are printed on the sheets in Step S44. Subsequently, it is discriminated whether all the print data have been printed in Step S45. If there still remains the data to be printed (NO in Step S45), this routine returns to Step S32. On the other hand, if all the data have been printed (YES in Step S45), the driving of the main motor 21 is stopped in Step S46, thereby completing the image forming operation.

In this way, when the sheet runs out in either one of the sheet aligning units 40a, 40b, the image forming operation is stopped along all the transport paths. Accordingly, the transfer device 11 and the transport path downstream therefrom can be prevented from getting smeared due to the image forming operations carried out despite the fact that no sheets are being fed. Since the remaining sheets are fed and discharged, the images can be constantly formed on the sheets being fed side by side. Further, the absence of sheet can be notified, and the sheets can be set in the cassette promptly since a desired number of sheets can be set in this image forming apparatus.

Although two sheets are fed simultaneously side by side in the foregoing embodiments, three or more sheets may be fed in the similar manner. In this case, the number of sheet sensors 1 may be equal to the number of stacks of sheets contained in a cassette.

Further, the presence or absence of a sheet in the sheet aligning units 40a, 40b is detected by means of the sheet sensors 1a, 1b in the foregoing embodiments. However, it may be also appropriate to detect the presence or absence of a sheet by means of the multifeed sensors 17 and the registration sensors 18 in place of the sheet sensors 1a, 1b.

The foregoing embodiments are described with respect to an image forming apparatus of the type in which an exposed area in a charged region on the surface of the photosensitive member 8 is developed into a visual image. However, the invention is also applicable to a type in which an unexposed area is developed into a visual image. In this case, a means for removing electric charges such as a blank lamp may be provided lest a visual image should be formed in an unnecessary region, Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image forming apparatus comprising:
   mount portion means for mounting a cassette containing a plurality of stacks of sheet material arranged side by side in rows to the image forming apparatus;
   feed means for feeding said sheet material side by side when the cassette is mounted to the mount portion means;
   image bearing means for bearing an electrostatic latent image;
   image forming means for forming the electrostatic latent image on the image bearing means, the electrostatic latent image including a plurality of sub-images with one sub-image being associated with each stack of sheet material;
   developer means for developing the electrostatic latent image to a toner image;
   transfer means for transferring the developed toner image to said sheet material being fed side by side;
   sheet material detector means positioned in proximity of said cassette for detecting a row in which said sheet material has been depleted from a stack of sheet material in said cassette; and
   control means for controlling the image forming means when depletion of said sheet material is detected by said sheet material detector means in any of said stacks of sheet material to thereby preclude forming a sub-image for the row associated with the depleted stack while continuing to form sub-images for the rows associated with the non-depleted stacks.

2. An image forming apparatus as defined in claim 1, wherein the sheet material detector means includes a plurality of photointerrupters arranged in correspondence with the respective stacks of sheet material contained side by side in the cassette mounted to the mount portion means.

3. An image forming apparatus as defined in claim 1, wherein when the depletion of the sheet material is detected in any of the rows, the control means controls the image forming means not to form an electrostatic latent image for all of the rows.

4. An image forming apparatus as defined in claim 3, wherein the feed means feeds the sheet material until the depletion of sheet material is detected in all the rows when no electrostatic latent image is formed at all on the image bearing means.

5. An image forming apparatus as defined in claim 1, wherein the image bearing means includes a photosensitive drum.

6. An image forming apparatus as defined in claim 1, wherein the image forming means includes a light emitting unit and a polygonal mirror.

7. An image forming apparatus comprising:
mount portion means for mounting a cassette containing a plurality of stacks of sheet material arranged side by side in rows to the image forming apparatus;
feed means for feed said sheet material side by side when the cassette is mounted to the mount portion means;
image bearing means for bearing an electrostatic latent image;
image forming means for forming a plurality of electrostatic latent images on the image bearing means;
developer means for developing the electrostatic latent image to toner images;
transfer means for transferring the developed toner image to said sheet material being fed side by side, respectively;
sheet material detector means positioned in proximity of said cassette for detecting a row in which said sheet material have been depleted from a stack of sheet material in said cassette; and
control means for controlling the image forming means when depletion of said sheet material from a stack of sheet material in said cassette is detected by said sheet material detector means in any of the rows to thereby preclude forming of an electrostatic latent for the row having the depleted sheet material while continuing to form an electrostatic latent image for the rows having non-depleted sheet material.

8. An image forming apparatus as defined in claim 7, wherein the sheet material detector means includes a plurality of photointerrupters arranged in correspondence with the respective stacks of sheet material contained side by side in the cassette mounted to the mount portion means.

9. An image forming apparatus as defined in claim 7, wherein when the depletion of the sheet material is detected in any of the rows, the control means controls the image forming means not to form an electrostatic latent image for all of the rows.

10. An image forming apparatus as defined in claim 9, wherein the feed means feeds the sheet material until the depletion of sheet material is detected in all the rows when no electrostatic latent image is formed at all on the image bearing means.

* * * * *